(12) United States Patent
Yoon et al.

(10) Patent No.: US 8,862,807 B2
(45) Date of Patent: Oct. 14, 2014

(54) SEMICONDUCTOR STORAGE DEVICE AND METHOD OF THROTTLING PERFORMANCE OF THE SAME

(75) Inventors: Han Bin Yoon, Hwaseong-si (KR); Yeong-Jae Woo, Guri-si (KR); Dong Gi Lee, Yongin-si (KR); Young Kug Moon, Suwon-si (KR); Hyuck-Sun Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 444 days.

(21) Appl. No.: 13/166,257

(22) Filed: Jun. 22, 2011

(65) Prior Publication Data

US 2012/0047319 A1 Feb. 23, 2012

(30) Foreign Application Priority Data

Aug. 20, 2010 (KR) .................. 10-2010-0080697
Aug. 20, 2010 (KR) .................. 10-2010-0080698
Aug. 20, 2010 (KR) .................. 10-2010-0080699

(51) Int. Cl.
*G06F 12/00* (2006.01)

(52) U.S. Cl.
USPC ........... 711/103; 711/102; 711/114; 711/465; 711/E12.008

(58) Field of Classification Search
USPC .................. 711/102–103, 114, 165, E12.008
See application file for complete search history.

(56) References Cited

U.S. PATENT DOCUMENTS

| | | | |
|---|---|---|---|
| 2003/0212872 A1* | 11/2003 | Patterson et al. | 711/165 |
| 2006/0168166 A1* | 7/2006 | Hardwick et al. | 709/221 |
| 2008/0126720 A1 | 5/2008 | Danilak | |
| 2008/0126891 A1 | 5/2008 | Danilak | |
| 2008/0228992 A1 | 9/2008 | Dumitru et al. | |
| 2009/0138671 A1 | 5/2009 | Danilak | |

* cited by examiner

*Primary Examiner* — Jasmine Song
(74) *Attorney, Agent, or Firm* — Stanzione & Kim, LLP

(57) ABSTRACT

A semiconductor storage device (SSD) and a method of throttling performance of the SSD are provided. The method can include includes gathering at least two workload data items related with to a workload of the semiconductor storage device, estimating the workload using the at least two workload data items, and throttling the performance of the semiconductor storage device according to the estimated workload. Accordingly, a workload that the semiconductor storage device will undergo can be estimated.

21 Claims, 23 Drawing Sheets

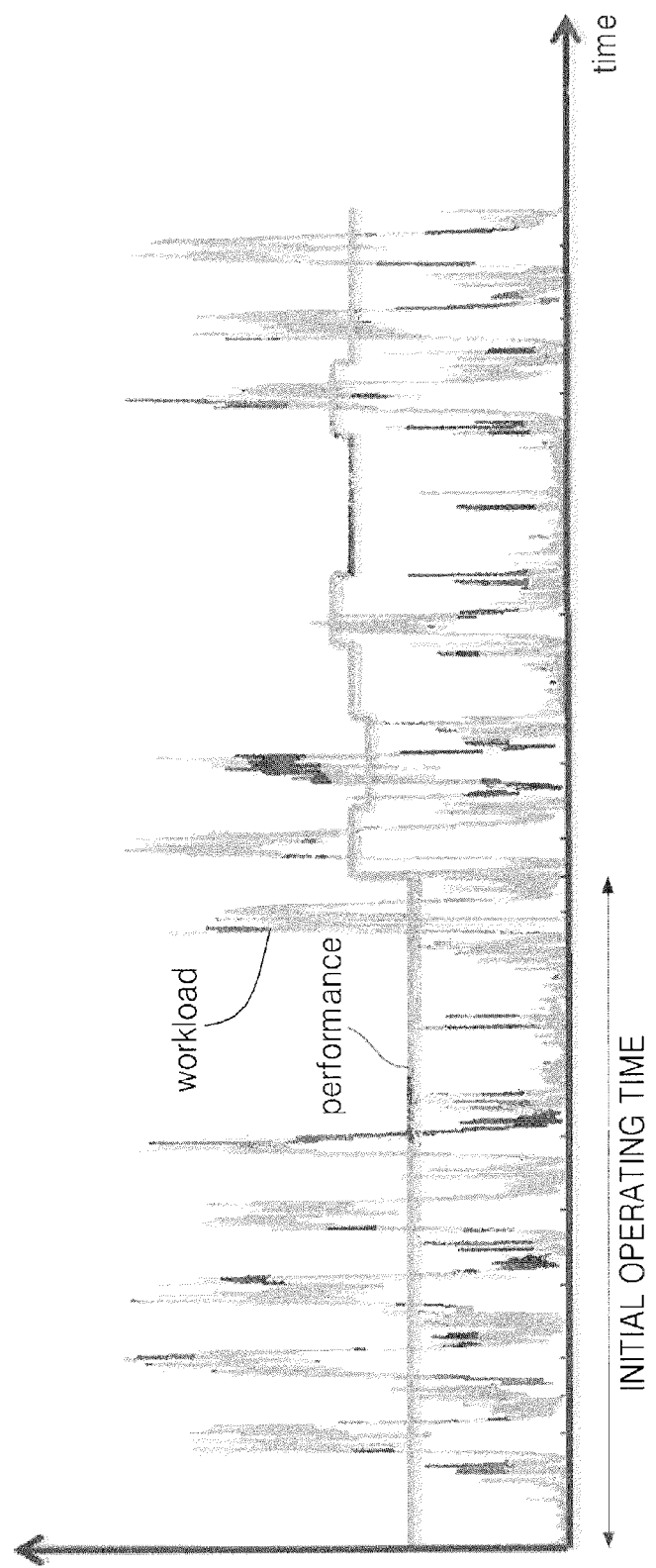

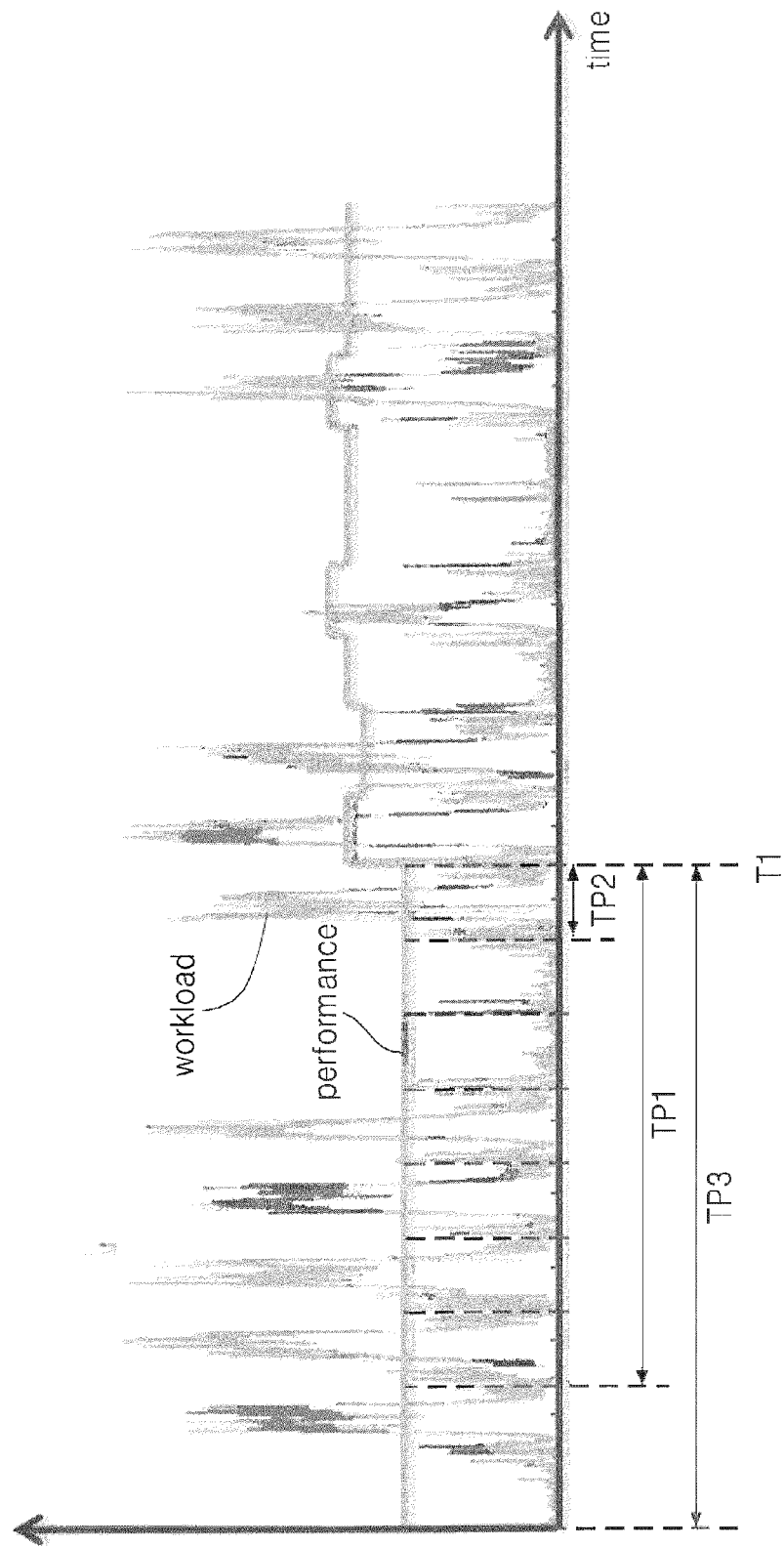

FIG. 11A

| Name | Description | |
|---|---|---|
| Feature | 1 | |
| Count | Bit   Description<br>7:1   N/A<br>0     1 for THROTTLING ENABLE, 0 for THROTTLING DISABLE | |
| LBA | N/A | |
| Device | Bit   Description<br>7     Obsolete<br>6     Shall be set to one<br>5     Obsolete<br>4     Transport Dependent<br>3:0  Reserved | |
| Command | 7:0   FAh | |

FIG. 11B

| Name | Value |
|---|---|
| Feature | 2 |
| Count | 1 (TO RECEIVE DATA OF 1 SECTOR FROM SSD) |
| LBA | Reserved |
| Device | Reserved |
| Command | 0xFA (THROTTLING INFORMATION REPORT COMMAND) |

FIG. 12

| Name | Value |
|---|---|
| Feature | Reserved |
| Count | Reserved |
| LBA | Reserved |
| Device | Reserved |
| Command | Reserved |

| Data (1 Sector = 512 Byte) |
|---|
| THROTTLING INFORMATION 1 |
| THROTTLING INFORMATION 2 |
| : : |

FIG. 13

| |
|---|
| Throttling flag |
| Initial performance level |
| Parameter gathering period |
| Parameters |

| | |
|---|---|
| | Host command count |
| | Host write command count |
| | Host read command count |
| | Host command sector count |
| | Host command sector count |
| | Host write command sector count |
| | Host read command sector count |
| | Device program operation count |
| | Device read operation count |

SEMICONDUCTOR STORAGE DEVICE AND METHOD OF THROTTLING PERFORMANCE OF THE SAME

CROSS-REFERENCE TO RELATED APPLICATIONS

This application claims priority under 35 U.S.C. §119(e) to Korean Patent Application No. 10-2010-0080697 filed on Aug. 20, 2010, in the Korean Intellectual Property Office, the benefit of Korean Patent Application No. 10-2010-0080698 filed on Aug. 20, 2010, in the Korean Intellectual Property Office, and the benefit of Korean Patent Application No. 10-2010-0080699 filed on Aug. 20, 2010, in the Korean Intellectual Property Office, the disclosures of which are incorporated herein by reference in its theft entirety.

BACKGROUND

1. Field of the Inventive Concept

The present inventive concept relates to a data storage device, and more particularly, to a semiconductor storage device to store data in a non-volatile memory, and a method of throttling the performance of the semiconductor storage device.

2. Description of the Related Art

Semiconductor storage devices, which store data using a semiconductor device, especially, a non-volatile memory device, are advantageous in that they are fast, robust to physical shock, generate only a small amount of heat and/or noise, and can be miniaturized compared to a disk storage media, i.e., hard disk drives that have been widely used as large-capacity storage devices.

Meanwhile, semiconductor storage devices may have a limited life. For instance, a NAND flash memory device is divided into blocks each of which includes a plurality of pages. When a NAND flash memory device is used, a block is erased and then the pages in the block are sequentially programmed with data. To program with new data in the block in which all pages have been programmed, the block must be erased again. Such a procedure is referred to as a "program and erase" (PE) cycle. In a NAND flash memory device, the number of PE cycles that a block can endure is limited, which is referred to as the endurance of the NAND flash memory device.

When the number of PE cycles experienced by a block exceeds an endurance limit, the block is more likely to operate in error afterwards. Besides program and erase operations, read operations and spontaneous charge loss may cause memory to operate in error. When the probability of erroneous operation increases, semiconductor storage devices should not be used any more for data integrity. Therefore, semiconductor storage devices using a NAND flash memory device have a limit to the life.

In the above example, when excessive workloads, for example, write operations, erase operations, and read operations, are put on semiconductor storage devices, the life thereof may be shortened or the expected life may not be ensured. To ensure the expected life of semiconductor storage devices, therefore, it is necessary to throttle the processing performance of semiconductor storage devices according to the intensity or amount of workloads put thereon.

For instance, recently a solid state drive (SSD) has been developed including a multi-level cell (MLC) NAND flash memory for server applications. Such server-bound storage devices require high performance, i.e., high input/output (I/O) per second and have the a wide fluctuation of workloads. When MLC NAND flash memory with an endurance limit is used in these applications, it is difficult to guarantee the life of an SSD.

A storage device whose life needs to be guaranteed is not restricted to a server-bound storage device. The lives of storage devices to be used in personal computers (PCs), notebook computers, mobile terminals, and so on also need to be ensured.

Besides NAND flash memories, phase-change random access memories (PRAM), magnetic RAM (MRAM), resistive RAM (ReRAM), and ferroelectric RAM (FeRAM) are examples of memory devices with the an endurance limit. NAND flash memory with an endurance limit includes NAND flash memory using a floating gate and NAND flash memory using a charge trap flash (CTF).

As described above, an approach for increasing the life of a semiconductor storage device using non-volatile memory with an endurance limit or ensuring the expected life thereof is desired.

SUMMARY

Some embodiments of the present inventive concept provide a semiconductor storage device to estimate a workload and adaptively throttle the performance according to the workload to ensure the expected life, and methods of estimating the workload of the semiconductor storage device.

Additional aspects and utilities of the present general inventive concept will be set forth in part in the description which follows and, in part, will be obvious from the description, or may be learned by practice of the present general inventive concept.

Embodiments of the present general inventive concept provide a method of throttling performance of a semiconductor storage device including a non-volatile memory device and a controller controlling the non-volatile memory device. The method includes gathering at least two workload data items related with a workload of the semiconductor storage device, estimating the workload using the at least two workload data items, and throttling the performance of the semiconductor storage device according to the estimated workload.

Embodiments of the present general inventive concept also provide a method of maximizing the lifetime of a semiconductor storage device (SSD), the method comprising: collecting data corresponding to workload commands received by the SSD; operating the SSD according to respective ones of the workload commands received; estimating the workload of the SSD based on the collected data; and calculating a delay to be applied to next workload commands received by the SSD based on the estimated workload.

The estimating of the workload may be performed when a predetermined amount of data is collected.

The predetermined amount of data being collected can be set by the manufacturer.

The predetermined amount of data collected can be data collected until a predetermined period lapses.

The predetermined amount of data collected can be data collected until a predetermined parameter value exceeds a predetermined reference value.

In an embodiment, when no previous data is collected from workload commands, estimating the workload can be performed based on a predetermined workload level until the predetermined amount of data is collected.

In an embodiment, when no previous data is collected from workload commands, estimating the workload can be performed based on a virtual history of a workload level until the predetermined amount of data is collected.

The predetermined period can be a period from start up of the SSD to the current time.

The predetermined period can be a period of the previous day, the previous week, the previous month, or any other predetermined time period.

Embodiments of the present general inventive concept also provide a method of maximizing the lifetime of a semiconductor storage device (SSD), the method comprising: determining whether a performance throttling mode of the SSD is set upon powering on of the SSD; estimating a workload of the SDD from workload data gathered based on a command received from a host, when the performance throttling mode of the SSD is set; and starting performance throttling of the SDD based on the estimated workload.

The workload data used to estimate a workload of the SSD can be a value of a parameter counted during a predetermined period.

The parameter counted can be at least one among a number of commands that the host sends to the SSD.

The parameter counted may be one among a number of write commands that the host sends to the SSD, a number of read commands that the host sends to the SSD, an amount of data transferred to/from the host in response to a command, the amount of data received from the host in response to write commands, the amount of data transferred to the host in response to read commands, the number of program operations performed in the SSD, and the number of read operations performed in the SSD.

Embodiments of the present general inventive concept also provide a method of throttling performance of a semiconductor storage device (SSD), the method comprising: enabling throttling of the SSD; performing initial throttling of the SSD with a predetermined performance level; gathering workload data based on commands received from a host; and starting a performance throttling of the SDD based on a predetermined amount of the gathered workload data.

In an embodiment, the initial throttling of the SSD may be set based on a hypothetical workload history of the SSD.

The predetermined amount of the gathered workload data can be determined based on a value of a parameter counted during a predetermined period.

Embodiments of the present general inventive concept also provide a semiconductor storage device (SSD), comprising: a non-volatile memory device; and a controller to control the non-volatile memory device to read and write data, to collect data corresponding to workload commands received by the SSD, to estimate the workload of the SSD based on the collected workload data, and to determine a new target performance level of the SSD based on the estimated workload.

In an embodiment, the controller may include: a workload module to perform the data collecting data corresponding to workload commands received by the SSD and to estimate the workload based on the collected workload data; and a throttle module control to determine the target performance level of the SSD and to throttle the performance of the SSD based on the determined performance level.

The throttle module can throttle the performance of the SSD by applying the determined performance level to a clock generator of the SSD.

Embodiments of the present general inventive concept also provide a method of controlling performance of a semiconductor storage device (SSD), the method comprising: operating the SSD according to a preset performance level; when a command is received to enable performance throttling of the SSD, gathering workload data to estimate a workload on the SSD; and applying performance throttling on the SSD when a predetermined amount of workload data has been gathered.

The preset performance level of operating the SSD may be set as a hypothetical workload history of the SSD.

The workload data gathered may be a value of a parameter counted during a predetermined period.

The parameter may include at least one among the number of commands that a host applies to the SSD, the number of write commands that the host applies to the SSD, the number of read commands that the host applies to the SSD, the amount of data transferred to/from the host in response to a command, the amount of data received from the host in response to write commands, the amount of data received from the host in response to read commands, the number of program operations performed in the SSD, and the number of read operations performed in the SSD.

BRIEF DESCRIPTION OF THE DRAWINGS

The above and/or other features and utilities of the present general inventive concept will become apparent and more readily appreciated from the following description of the exemplary embodiments, taken in conjunction with the accompanying drawings, in which:

FIG. 8A is a graph explaining a method of operating a semiconductor storage device during an initial operating time according to some embodiments of the present inventive concept;

FIG. 8B is a graph explaining a workload data gathering period;

FIGS. 11A and 11B are tables showing the formats of a performance throttling enable command and a performance throttling information request command, respectively, according to some embodiments of the present inventive concept;

FIG. 12 is a table showing the format of a performance throttling information response command according to some embodiments of the present inventive concept;

FIG. 13 is a diagram showing performance throttling data used in the operation of a semiconductor storage device according to some embodiments of the present inventive concept;

DETAILED DESCRIPTION OF THE EMBODIMENTS

Figure 1:
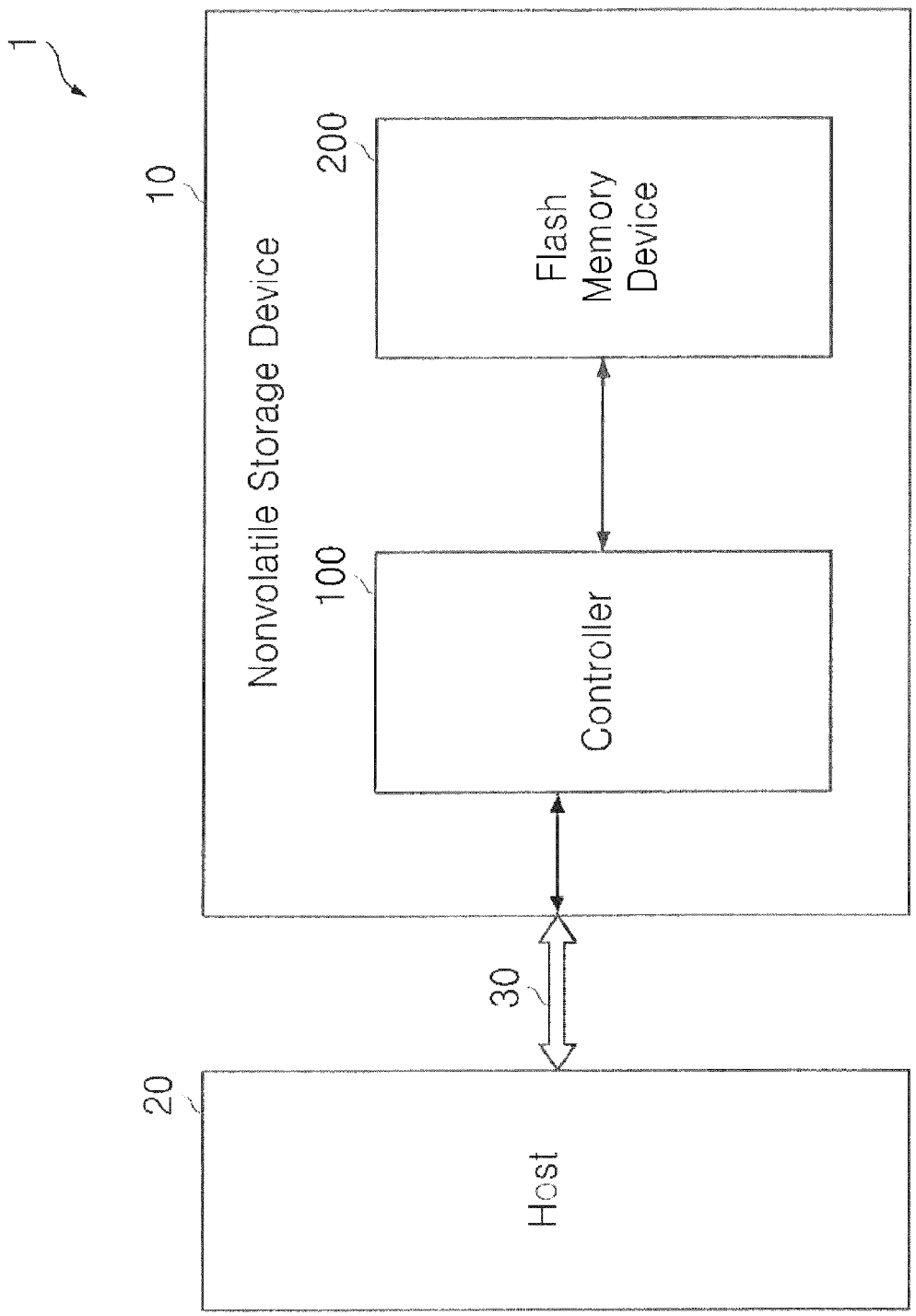
FIG. 1 is a schematic block diagram of a data storage system according to some embodiments of the present inventive concept.

The present inventive concept now will be described more fully hereinafter with reference to the accompanying drawings, in which embodiments of the inventive concept are shown. This general inventive concept may, however, be embodied in many different forms and should not be construed as limited to the embodiments set forth herein. Rather, these embodiments are provided so that this disclosure will be thorough and complete, and will fully convey the scope of the general inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The present inventive concept relates to a method of grasping and estimating workloads, i.e., the intensity and the pattern of the workloads that a semiconductor storage device will undergo before throttling the performance of the semiconductor storage device. Only after the intensity and the pattern of workloads are obtained, can the optimal performance of the semiconductor storage device be optimized with respect to the ensured life and the endurance limit of the semiconductor storage device.

FIG. 1 is a schematic block diagram of a data storage system 1 according to some embodiments of the present inventive concept. The data storage system 1 includes a semiconductor storage device 10 and a host 20. The semiconductor storage device 10 includes a controller 100 and a non-volatile memory device, such as, for example, a flash memory device 200.

The host 20 may communicate with the semiconductor storage device 10 using an interface protocol such as Peripheral Component Interconnect Express (PCI-E), Advanced Technology Attachment (ATA), Serial ATA (SATA), Parallel ATA (PATA), or Serial Attached SCSI (SAS). However, the interface protocol between the host 20 and the semiconductor storage device 10 is not restricted to the above examples, and may be a universal serial bus (USB) protocol, a multi-media card (MMC) protocol, or an integrated drive electronics (IDE) protocol.

The semiconductor storage device 10 may be a solid state drive (SSD) or a secure digital (SD) card, but the present inventive concept is not restricted thereto. The non-volatile memory device 200 may be a flash memory device, but the present inventive concept is not restricted thereto. The non-volatile memory device 200 may be a phase-change random access memory (PRAM) device, a magnetic RAM (MRAM) device, a resistive RAM (ReRAM) device, or a ferroelectric RAM (FeRAM) device. When the non-volatile memory device 200 is a flash memory device, it may be a NAND flash memory device using a floating gate or charge trap flash (CTF). Memory cell transistors included in the non-volatile memory device 200 may be arranged in two dimensions or in three dimensions.

The controller 100 controls the overall operation of the semiconductor storage device 10 and controls all data exchange between the host 20 and the non-volatile memory device 200. For instance, the controller 100 controls the non-volatile memory device 200 to write or read data at the request of the host 20. Also, the controller 100 controls internal operations, such as performance throttling, merging, and wear-leveling, necessary for the characteristics or the efficient management of the non-volatile memory device 200.

The non-volatile memory device 200 is a storage device to store data in a non-volatile state. It may store an operating system (OS), various programs, and diverse data.

Figure 2:
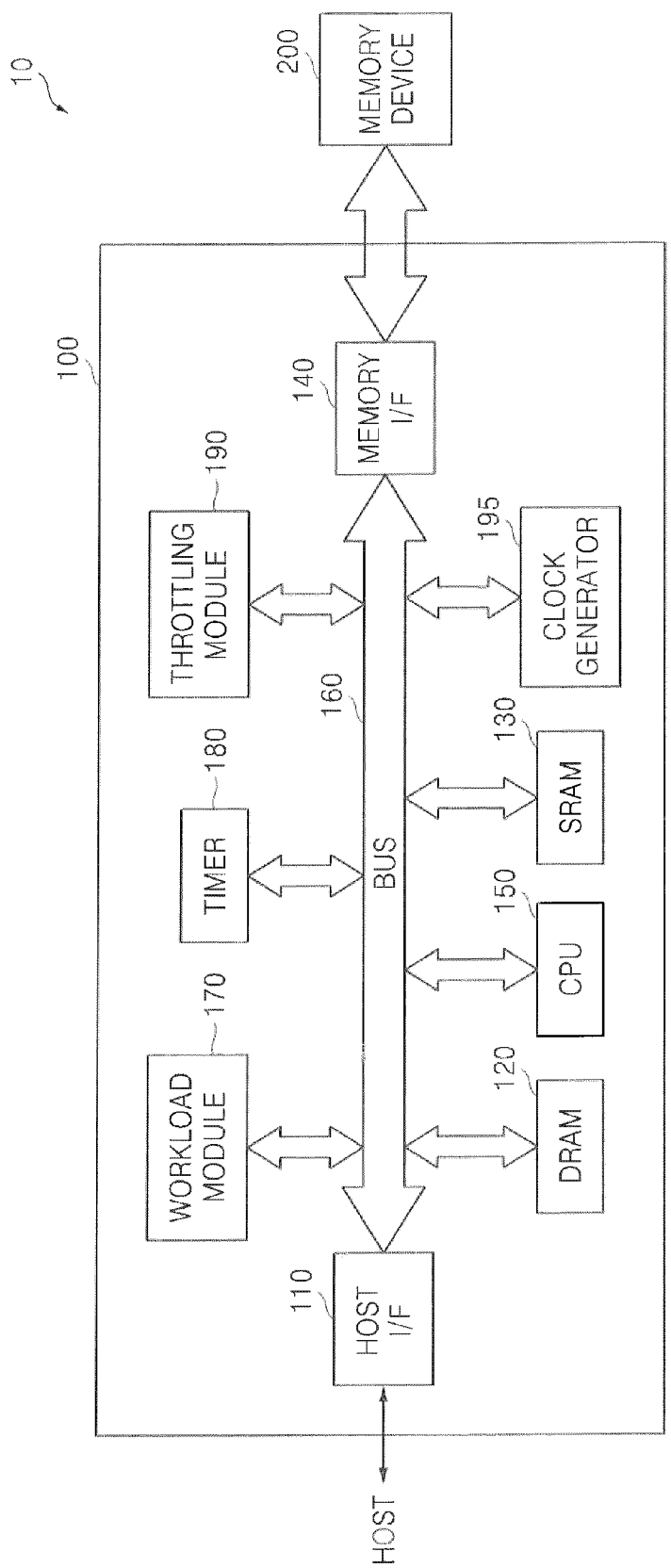
FIG. 2 is a schematic block diagram of a controller according to some embodiments of the present inventive concept.

FIG. 2 is a schematic block diagram of the controller 100 according to some embodiments of the present inventive concept. The controller 100 includes a host interface (I/F) 110, a dynamic RAM (DRAM) 120, a static RAM 130, a memory interface (I/F) 140, a central processing unit (CPU) 150, a bus 160, a workload module 170, a timer 180, a throttling module 190, and a clock generator 195.

The host I/F 110 is equipped with one of the interface protocols described above to communicate with the host 20. The DRAM 120 and the SRAM 130 store data and/or programs in a volatile state. The memory I/F 140 interfaces with the non-volatile memory device 200. The CPU 150 performs an overall control operation to write data to and/or read data from the non-volatile memory device 200. The workload module 170 gathers workload data related to a workload put on the semiconductor storage device 10 and estimates the workload based on the gathered workload data. The throttling module 190 determines a target performance level according to the workload estimated by the workload module 170 and throttles the performance of the semiconductor storage device 10 based on the determined performance level. The timer 180 provides time information to the CPU 150, the workload module 170, and the throttling module 190.

The workload module 170, the timer 180, and the throttling module 190 may be implemented in hardware, software, or combination thereof. When the workload module 170, the timer 180, and the throttling module 190 are implemented in software, a relevant program may be stored in the non-volatile memory device 200 and it may be loaded to the SRAM 130 and executed by the CPU 150 when the semiconductor storage device 10 is powered on.

The clock generator 195 generates a clock signal necessary for the operation of each of the CPU 150, the DRAM 120, and the non-volatile memory device 200 and provides it to each element. The clock signals respectively provided to the CPU 150, the DRAM 120, and the non-volatile memory device 200 may have different speeds. The clock generator 195 may control the speed of a clock signal applied to each of the CPU 150, the DRAM 120, and the non-volatile memory device 200 according to the performance level determined by the throttling module 190, so that the performance of the semiconductor storage device 10 can be throttled.

Although not shown, the semiconductor storage device 10 may also include other elements such as a read-only memory (ROM), which stores code data executed when the semiconductor storage device 10 is powered on, and an error correction code (ECC) engine, which encodes data to be stored in the non-volatile memory device 200 and decodes data read from the non-volatile memory device 200.

Figure 3:
FIG. 3 is a diagram showing the schematic structure of a non-volatile memory device illustrated in FIG. 2.

FIG. 3 is a diagram showing the schematic structure of the non-volatile memory device 200 illustrated in FIG. 2. The non-volatile memory device 200 may include a plurality of memory elements. The non-volatile memory device 200 illustrated in FIG. 3 has the hardware structure of 4 channels and 3 banks, but the present inventive concept is not restricted thereto.

In the semiconductor storage device 10 illustrated in FIG. 3, the controller 100 is connected with the non-volatile memory device 200 through four channels A, B, C, and D each of which is connected to three flash memory elements CA0 through CA2, CB0 through CB2, CC0 through CC2, or CD0 through CD2, respectively. It is apparent that the numbers of channels and banks are not restricted to the current embodiments, but may be changed. In such a structure, the performance of the semiconductor storage device 10 may be throttled by the entire non-volatile memory device 200, by buses or channels shared by memory elements or chips, by banks, or by individual memory elements. Here, a bank is a group of memory elements positioned at the same offset on different channels.

Figure 4:
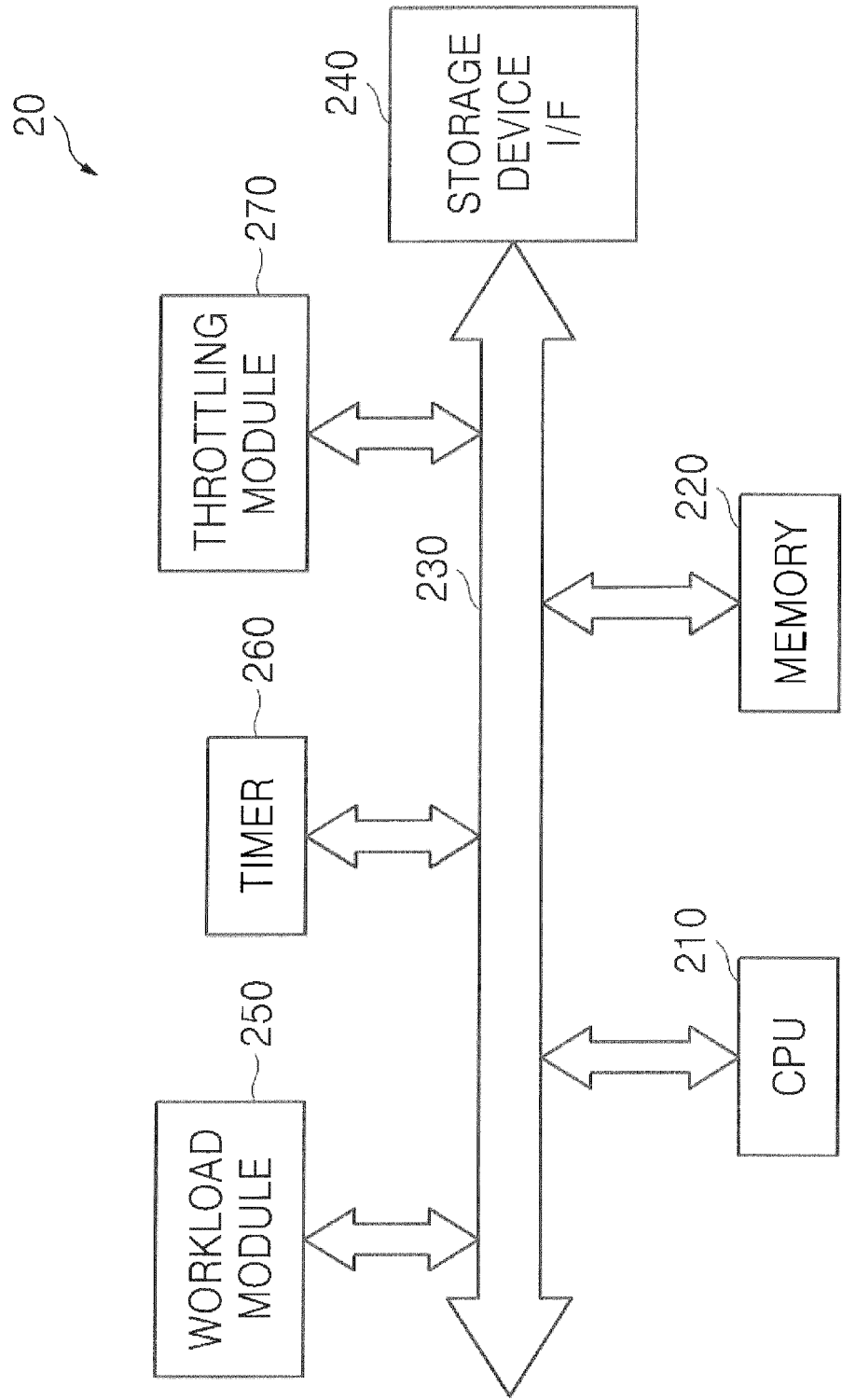
FIG. 4 is a schematic block diagram of a host according to some embodiments of the present inventive concept.

FIG. 4 is a schematic block diagram of the host 20 according to some embodiments of the present inventive concept. The host 20 includes a CPU 210, a memory 220, a bus 230, a storage device I/F 240, a workload module 250, a timer 260, and a throttling module 270.

The storage device I/F 240 is equipped with an interface protocol to communicate with the semiconductor storage device 10. The CPU 210 performs an overall control operation to write data to and/or read data from the semiconductor storage device 10. The workload module 250 gathers workload data related with a workload put on the semiconductor storage device 10 and estimates the workload based on the gathered workload data. The throttling module 270 determines a target performance level according to the workload estimated by the workload module 250 and throttles the performance of the semiconductor storage device 10 based on the determined performance level. The timer 260 provides time information to the CPU 210, the workload module 250, and the throttling module 270.

The workload module 250, the timer 260, and the throttling module 270 may be implemented in hardware, software, or combination thereof. The workload module 250 and the throttling module 270 are provided so that the host 20 can throttle or control the performance of the semiconductor storage device 10. When the semiconductor storage device 10 throttles the performance by itself without intervention of the host 20, the host 20 may not include the workload module 250 and the throttling module 270.

Figure 5:
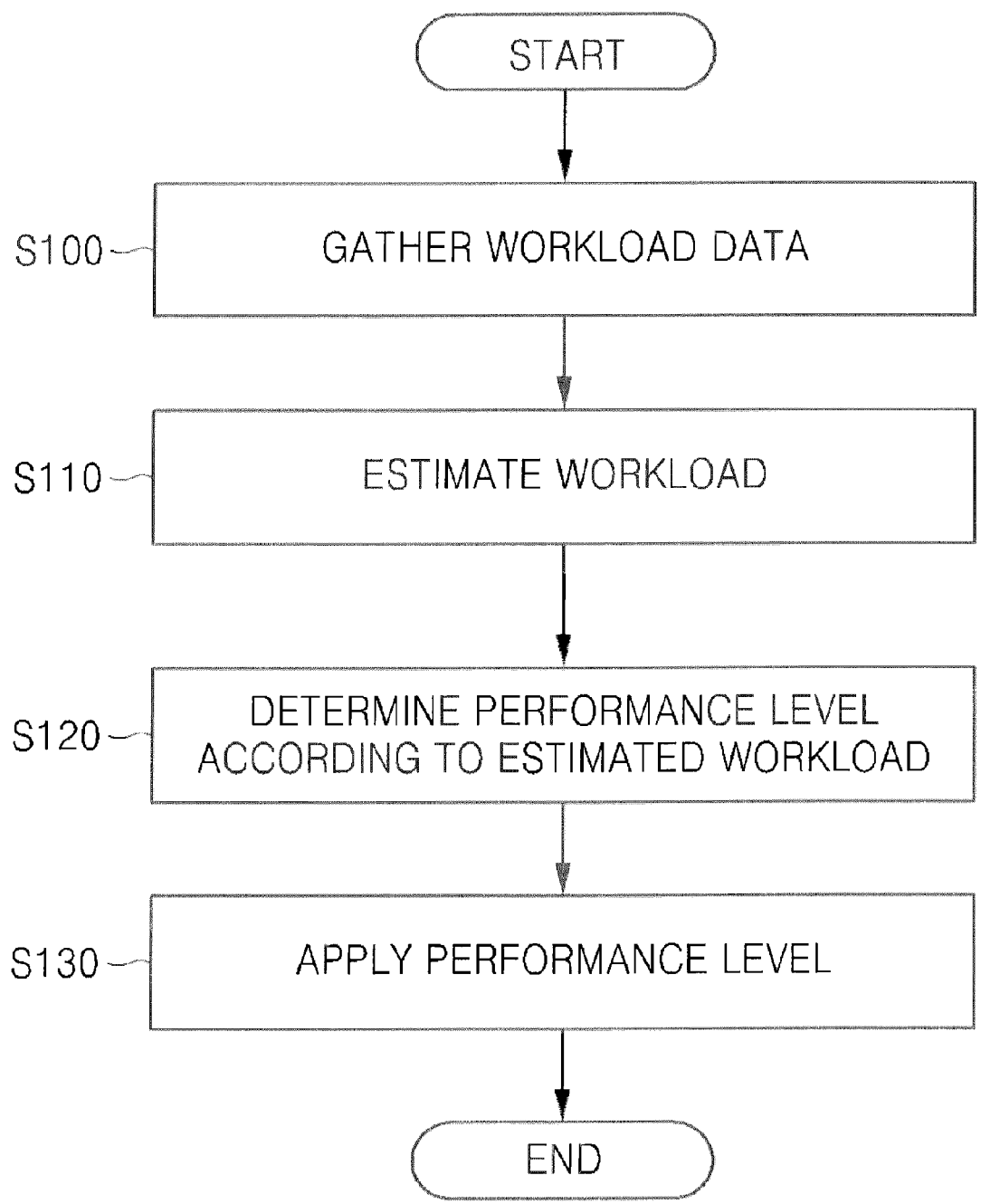
FIG. 5 is a flowchart of a method of operating a semiconductor storage device according to some embodiments of the present inventive concept.

FIG. 5 is a flowchart of a method of operating the semiconductor storage device 10 according to some embodiments of the present inventive concept. The method may be implemented in the semiconductor storage device 10 or the host 20 or implemented in a distributive manner in both the semiconductor storage device 10 and the host 20. In the embodiments of the present inventive concept, the method is implemented in the semiconductor storage device 10, but the present inventive concept is not restricted to these embodiments.

Referring to FIG. 5, the controller 100 gathers workload data related with a workload put on the semiconductor storage device 10 in operation S100 and estimates the workload based on the workload data in operation S110. The controller 100 determines a target performance level according to the estimated workload in operation S120 and applies the performance level to the operation of the semiconductor storage device 10 in operation S130.

Figure 17:
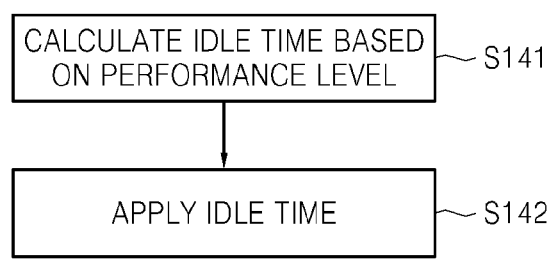
FIG. 17 is a flowchart of applying the performance level in operation S130 illustrated in FIG. 5 according to some embodiments of the present inventive concept.

FIG. 17 is a flowchart of applying the performance level in operation S130 illustrated in FIG. 5 according to some embodiments of the present inventive concept. Referring to FIG. 17, idle time(s) to be inserted between one or more operations of the semiconductor storage device 10 is calculated based on the performance level in operation S141. For example, the idle time calculated can be based on a delay in receiving data from the host 20. Alternatively, for example, the idle time to be inserted between one or more operations of the semiconductor storage device 10 can be determined based on an amount of workload. For example, if the workload of the SSD device is determined to be low at operation 100, then the idle time can be calculated to be lower in order to increase performance thereof. The idle time is applied in operation S142, as illustrated in FIG. 17.

As described above, the performance of the semiconductor storage device 10 may be throttled by inserting the idle time between one or more operations of the semiconductor storage device 10. The idle time may be inserted using the timer 180 or may be inserted by performing a meaningless operation (e.g., a NOP). The timer 180 may be implemented in hardware or software.

To effectively and decisively throttle the performance of the semiconductor storage device 10, the idle time may be designed to occur in addition to each unit operation of the semiconductor storage device 10. For instance, at each of a program operation to the non-volatile memory device 200, a read operation from the non-volatile memory device 200, a read/write operation from/to an internal buffer (e.g., a page buffer) of the non-volatile memory device 200, a read/write operation from/to a buffer (e.g., the DRAM 120 or the SRAM 130) of the controller 100, and a read/write operation from/to the host I/F 110, generation of a predetermined idle time or idle time proportional to the amount of data processed may be enabled.

Figure 6:
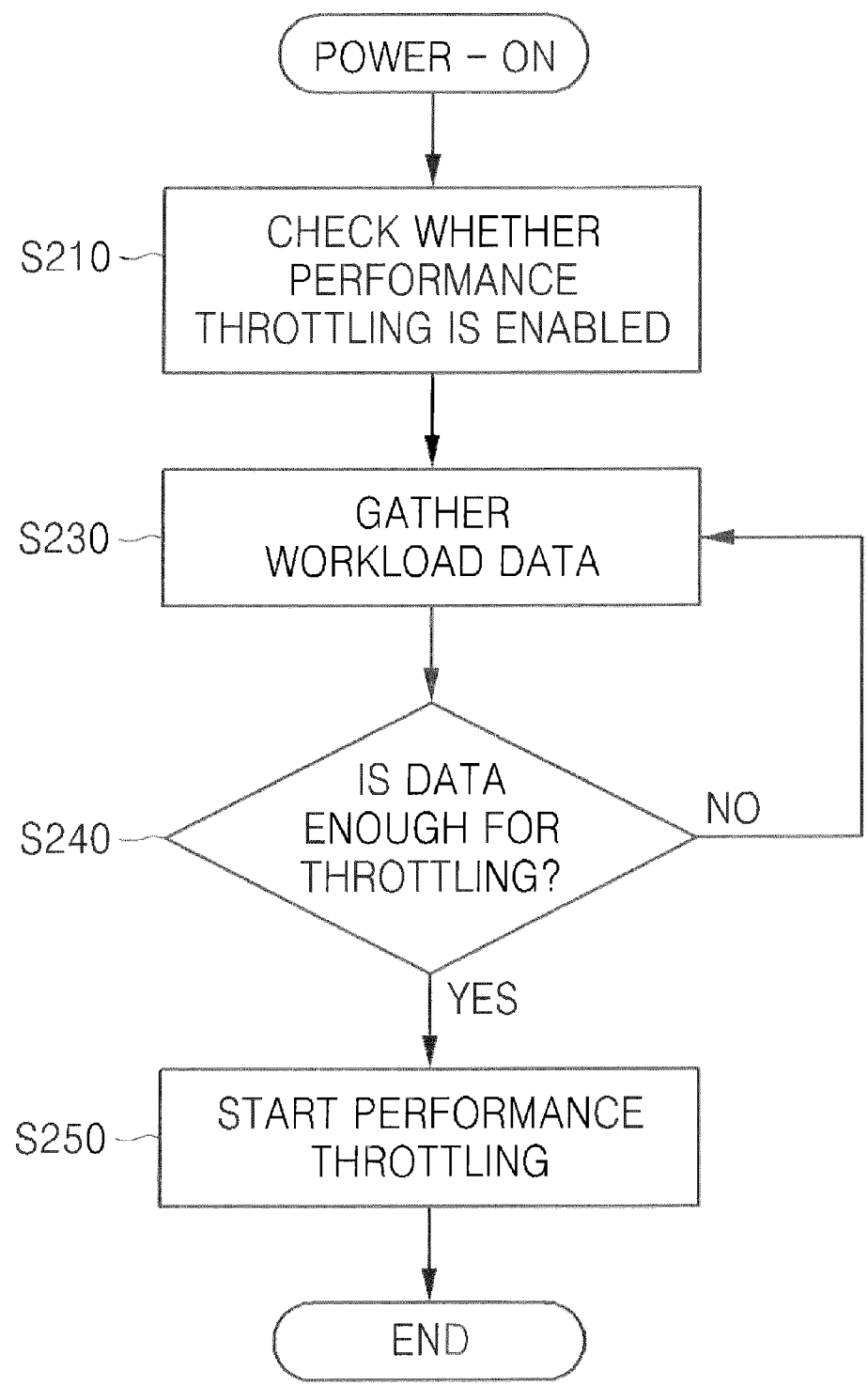
FIG. 6 is a flowchart of a method of estimating the workload of a semiconductor storage device according to some embodiments of the present inventive concept.

FIG. 6 is a flowchart of a method of estimating the workload of the semiconductor storage device 10 according to some embodiments of the present inventive concept. The method illustrated in FIG. 6 may be performed by the semiconductor storage device 10 illustrated in FIG. 2. However, a method of estimating the workload of the semiconductor storage device 10 according to other embodiments of the present inventive concept may be implemented in the host 20 illustrated in FIG. 4 or implemented in a distributive manner in both the semiconductor storage device 10 and the host 20.

Referring to FIGS. 2 and 6, when the semiconductor storage device 10 is powered on, it is checked whether the performance throttling of the semiconductor storage device 10 is enabled in operation S210. In order to indicate the enable state of performance throttling, a performance throttling flag illustrated in FIG. 13 may be used. When the performance throttling flag has been set, the controller 100 determines that the performance throttling has been enabled and progresses to subsequent operations S230 through S250. The performance throttling flag may be set before the semiconductor storage device 10 is released as a product or when the semiconductor storage device 10 is powered on. The controller 100 gathers workload data of the semiconductor storage device 10 in operation S230.

In other embodiments of the present inventive concept, operation S210 may be omitted. In other words, when the semiconductor storage device 10 is powered on, the controller 100 may gather the workload data of the semiconductor storage device 10 in operation S230.

The workload data used to estimate a workload may be the value of a parameter counted during a predetermined period. The parameter may include at least one among the number of commands that the host 20 applies to the semiconductor storage device 10, the number of write commands that the host 20 applies to the semiconductor storage device 10, the number of read commands that the host 20 applies to the semiconductor storage device 10, the amount of data transferred to/from the host 20 in response to a command, the amount of data received from the host 20 in response to write commands, the amount of data transferred to the host 20 in response to read commands, the number of program operations performed in the semiconductor storage device 10, and the number of read operations performed in the semiconductor storage device 10.

The amount of data transferred to/from the host 20 in response to a command, the amount of data received from the host 20 in response to write commands, and the amount of data transferred to the host 20 in response to read commands may be calculated by accumulating the value of a count field included in a host command. For instance, the amount of data received from the host 20 in response to write commands may be calculated by accumulating a sector (or block) count in a counter field included in a write command. A write command and a read command include a count field indicating the amount of data to be written or read. For instance, when the count field of a write command is set to "1", data of one sector is written in response to the write command.

The semiconductor storage device 10 may accumulate to count the workload data, i.e., parameters during a predetermined term or with a predetermined period in operation S230. Two or more parameter gathering periods may be set. For instance, a first period (for example, a week) and a second period (for example, a day) may be set as parameter gathering periods. Performance throttling may be performed with the minimum period (e.g., a day) among the parameter gathering periods, but the present inventive concept is not restricted thereto.

A parameter gathering period may be stored and managed together with the throttling flag in the memory 120 or 130 of the controller 100 or in the non-volatile memory device 200. The semiconductor storage device 10 may also start to accumulate and count parameters at a predetermined event, such as fabrication of the semiconductor storage device 10, power-on, enabling of a factory reset, reception of a predetermined command from the host 20, or enabling of performance throttling.

The gathered workload data may be stored and managed in the memory 120 or 130 of the controller 100 or in the non-volatile memory device 200. Alternatively, workload data may be uploaded from the non-volatile memory device 200 to the memory 120 or 130 of the controller 100 when the semiconductor storage device 10 is powered on, then updated and then re-stored in the non-volatile memory device 200 before the semiconductor storage device 10 is powered off.

Figure 7A:
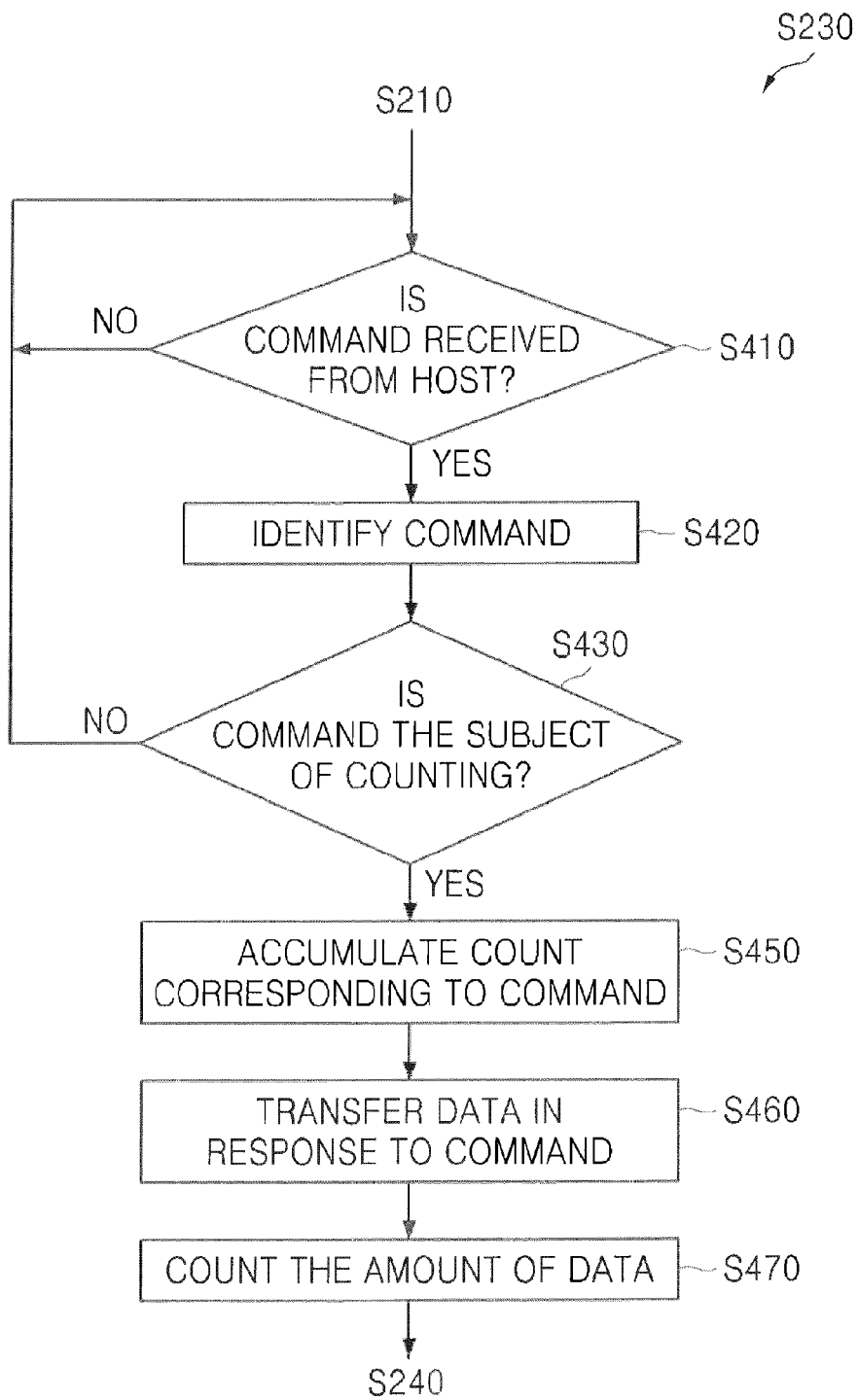
FIG. 7A is a detailed flowchart of the operation of gathering workload data in the method illustrated in FIG. 6.

FIG. 7A is a detailed flowchart of gathering the workload data in operation S230 illustrated in FIG. 6. Referring to FIG. 7A, the semiconductor storage device 10 waits for a command from the host 20 in operation S410. When the command is received from the host 20, the semiconductor storage device 10 parses and identifies the command in operation S420 and determines whether the command is the subject of counting in operation S430. When the command is sent from the host 20, a command decoder (not shown) included in the host I/F 110 receives and decodes the command and informs the CPU 150 and the workload module 170 of the reception of the command in operation S420.

When the command is the subject of counting, for example, a write command or a read command, the workload module 170 accumulates a count corresponding to the command, for example, a write command count and a command count, in operation S450. The semiconductor storage device 10 receives data from the host 20 or transmits data to the host 20 in response to the command in operation S460.

When the received command is a write command, the semiconductor storage device 10 may request the host 20 to send write data, receive the write data, and temporarily store it in the DRAM 120 in operation S460. At this time, the semiconductor storage device 10 counts the amount of data transmitted thereto in operation S470. The command sent from the host 20 to the semiconductor storage device 10 may include a command field and a count field similarly to command formats illustrated in FIGS. 11A and 11B. The count field (e.g., a sector count field) may have a value indicating the number of sectors corresponding to the amount of data. Accordingly, the semiconductor storage device 10 may read and accumulate a count field value included in the command in operation S470.

Figure 7B:
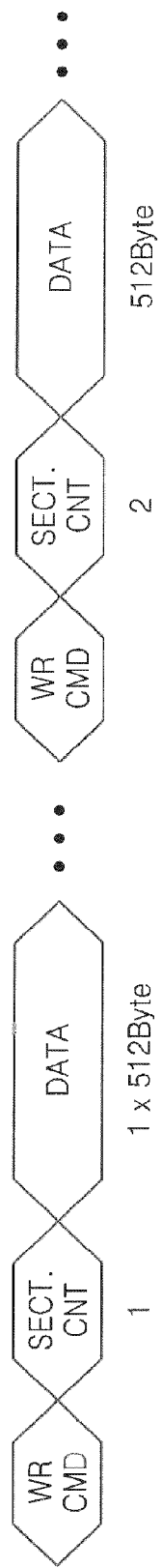
FIG. 7B is a schematic timing chart when a write command and write data is received from a host.

FIG. 7B is a schematic timing chart when a write command and write data is received from the host 20. Referring to FIG. 7B, a first write command WR CMD, a sector count value (e.g., "1"), and write data (e.g., 1×512 byte data) corresponding to the sector count value may be sequentially received from the host 20 and then a second write command WR CMD, a sector count value (e.g., "2"), and write data (e.g., 2×512 byte data) corresponding to the sector count value may be sequentially received from the host 20. At this time, the sector count values (i.e., "1" and "2") may be counted to be used as a count value of the amount of data.

When the received command is a read command, the semiconductor storage device 10 reads data from the non-volatile memory device 200 and transmits the data to the host 20 in operation S460. At this time, the semiconductor storage device 10 may count the amount of data transmitted to the host 20 in operation S470.

Referring back to FIG. 6, when enough workload data for performance throttling is gathered in operation S240, the controller 100 starts the performance throttling in operation S250. Here, the enough workload data may be gathered when a predetermined period (e.g., a performance throttling period) lapses or when a predetermined parameter value (e.g., the number of commands cumulated from the fabrication of the semiconductor storage device 10) exceeds a predetermined reference.

In other embodiments of the present inventive concept, when the enough workload data is gathered in operation S240, the controller 100 may enable the performance throttling by setting the throttling flag.

When the performance throttling starts in operation S250, the controller 100 estimates a workload based on the workload data in operation S110 as illustrated in FIG. 5. At this time, the semiconductor storage device 10 may estimate the workload by performing a weighted sum or a weighted average of at least two count values.

A workload $WL_k$ on a k-th day may be estimated using three workload data items in Equation (1):

$$WL_k = F(\text{Workload}_{Recentweek}, \text{Workload}_{Recentday}, \text{Workload}_{SincePoerOn}) = F'(PR_{Recentweek}, PR_{Recentday}, PR_{SincePoerOn}), \quad (1)$$

where $\text{Workload}_{Recentweek}$ is an average workload for one recent week, $\text{Workload}_{Recentday}$ is an average workload for one recent day, $\text{Workload}_{SincePoerOn}$ is an average workload since the semiconductor storage device 10 is powered on, and F is a function (e.g., a weighted sum or a weighted average) of calculating a workload estimate using the three workload data items as factors. In addition, $PR_{Recentweek}$, $PR_{Recentday}$, and $PR_{SincePoerOn}$ are accumulated (or average) values of a predetermined parameter (e.g., the numbers of write commands) for one recent week, one recent day, and a period from the power-on till the present, respectively.

FIG. 8B is a graph explaining a workload data gathering period. Referring to FIG. 8B, the workload data gathering period may include, on the basis of a workload estimation point T1, a first period (e.g., one recent week) TP1, a second period (e.g., one recent day) TP2, and a third period (e.g., a period from the power-on till the present, i.e., the workload estimation point T1) TP3.

Figure 8C:
FIG. 8C is a graph explaining the change of the workload data gathering period in accordance with a workload estimation point.

FIG. 8C is a graph explaining the change of the workload data gathering period in accordance with a workload estimation point. Referring to FIG. 8C, when the workload estimation point changes from T1 to T2, the first period changes from the one recent week TP1 counting back from the point T1 into one recent week TP1' counting back from the point T2; the second period changes from the one recent day TP2 counting back from the point T1 into one recent day TP2' counting back from the point T2; and the third period changes from the period TP3 from the power-on till the present T1 into a period TP3' from the power-on till the present T2. For instance, when the workload is estimated per one day, the first period and the second period shift to the right by one day over time and the third period gradually increases over time.

The workload $WL_k$ on the k-th day may be estimated using a weighted sum in Equation (2):

$$WL_k = G\left[\frac{\alpha_1}{7}\left(\sum_{i=k-7}^{k-1} PR_i\right) + \alpha_2(PR_{k-1}) + \frac{\alpha_3}{k-1}\left(\sum_{i=0}^{k-1} PR_i\right)\right], \quad (2)$$

where $\alpha_1$, $\alpha_2$, and $\alpha_3$ are weights assigned to a workload for one recent week, a workload for one recent day, and a workload accumulated from the power-on, respectively, and G is a predetermined constant.

In the above embodiments, a workload is estimated per day, but a workload estimation period may be changed.

Thereafter, the controller 100 determines a target performance level according to the estimated workload in operation S120. The target performance level for the k-th day can be calculated using the estimated workload. At this time, a predetermined equation or a look-up table mapping a workload to a performance level may be used.

Thereafter, the performance level is applied to the operation of the semiconductor storage device 10 in operation S130.

Before the performance throttling, i.e., during an initial operating time (e.g., a predetermined period of time from the power-on) of the semiconductor storage device 10, an initial performance level may be used. The initial performance level is a performance level that is used in the semiconductor storage device 10 during the initial operating time before enough workload data to estimate a workload is gathered. Like the throttling flag and the parameter gathering period, the initial performance level may be set before the semiconductor storage device 10 is released as a product or when the semiconductor storage device 10 is powered on.

Alternatively, instead of the initial performance level, a hypothetical workload history may be set in the semiconductor storage device 10. Setting the hypothetical workload history refers to making an assumption that the semiconductor storage device 10 undergoes a hypothetical workload during a predetermined period before being powered on. To set the hypothetical workload history, various parameters illustrated in FIG. 13 may be set to predetermined values in the semiconductor storage device 10. For instance, the initial value of each parameter illustrated in FIG. 13 is not set to "0" but to a predetermined hypothetical value.

When the hypothetical workload history is set, the semiconductor storage device 10 estimates a workload based on data of the hypothetical workload history in operation S110 as soon as it is powered on, determines a target performance level according to the estimated workload in operation S120, and uses the target performance level in operation S130.

The target performance level may be stored in a register (not shown) of the semiconductor storage device 10 or the memory 120, 130, or 200. In particular, the semiconductor storage device 10 may store a current performance level before it is powered off and then, when it is powered on next time, it may read and use the stored performance level.

Performance may be a write performance or a read performance. A write performance level may be represented with the amount (MB/s) of data written per a unit period of time, the number of write commands processed per the unit period of time, or a write level value. Similarly, a read performance level may be represented with the amount (MB/s) of data read per a unit period of time, the number of read commands processed per the unit period of time, or a read level value. Here, a level value is a numerical value of each of a plurality of levels into which performance is classified. For instance, the write performance may be classified into level 0 indicating the lowest performance to level 10 indicating the highest performance.

Figure 9:
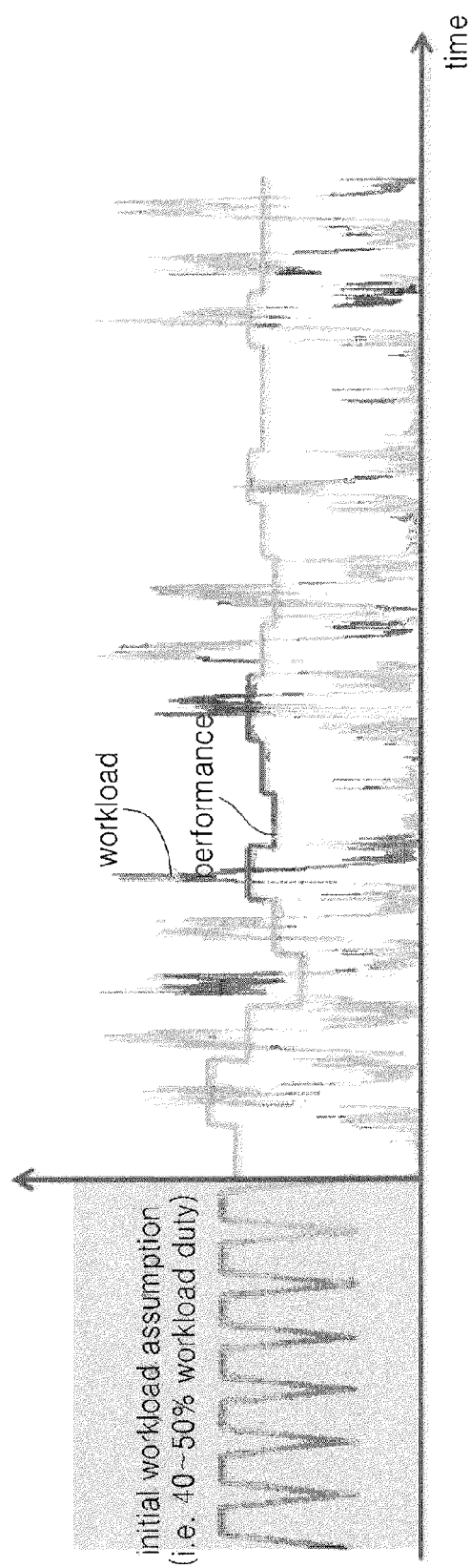
FIG. 9 is a graph explaining a method of operating a semiconductor storage device during an initial operating time according to other embodiments of the present inventive concept.

FIGS. 8A and 9 are graphs explaining some exemplary operations of the semiconductor storage device 10 during the initial operating time. In detail, the graphs illustrated in FIGS. 8A and 9 are provided to explain an initial performance throttling scheme of the semiconductor storage device 10 during the initial operating time while workload data has not yet gathered enough to grasp the intensity and the pattern of a workload.

The graph illustrated in FIG. 8A refers to a scheme using delayed throttling. In this scheme, an initial performance is maintained at a predetermined level during the initial operating time of the semiconductor storage device 10 and the level of the performance is maintained until enough data to detect the intensity and the pattern of a workload is gathered. When enough workload data to detect the intensity and the pattern of a workload is gathered, how much the performance throttling will be adjusted is determined based on the gathered data. Accordingly, referring to FIG. 8A, the performance level is fixed to an initial value during the initial operating time and thereafter the performance level is adjusted using accumulated workload data. In other words, the performance level is maintained at a predetermined value during the initial operating time and is adjusted according to an estimated workload afterward.

The graph illustrated in FIG. 9 refers to a scheme using a hypothetical workload history. In this scheme, the host 20 predicts the intensity and the pattern of a workload to be put on the semiconductor storage device 10 and assumes a hypothetical workload history. During the initial operating time of the semiconductor storage device 10, how much the performance throttling will be adjusted is determined based on the hypothetical workload history.

Figure 10A:
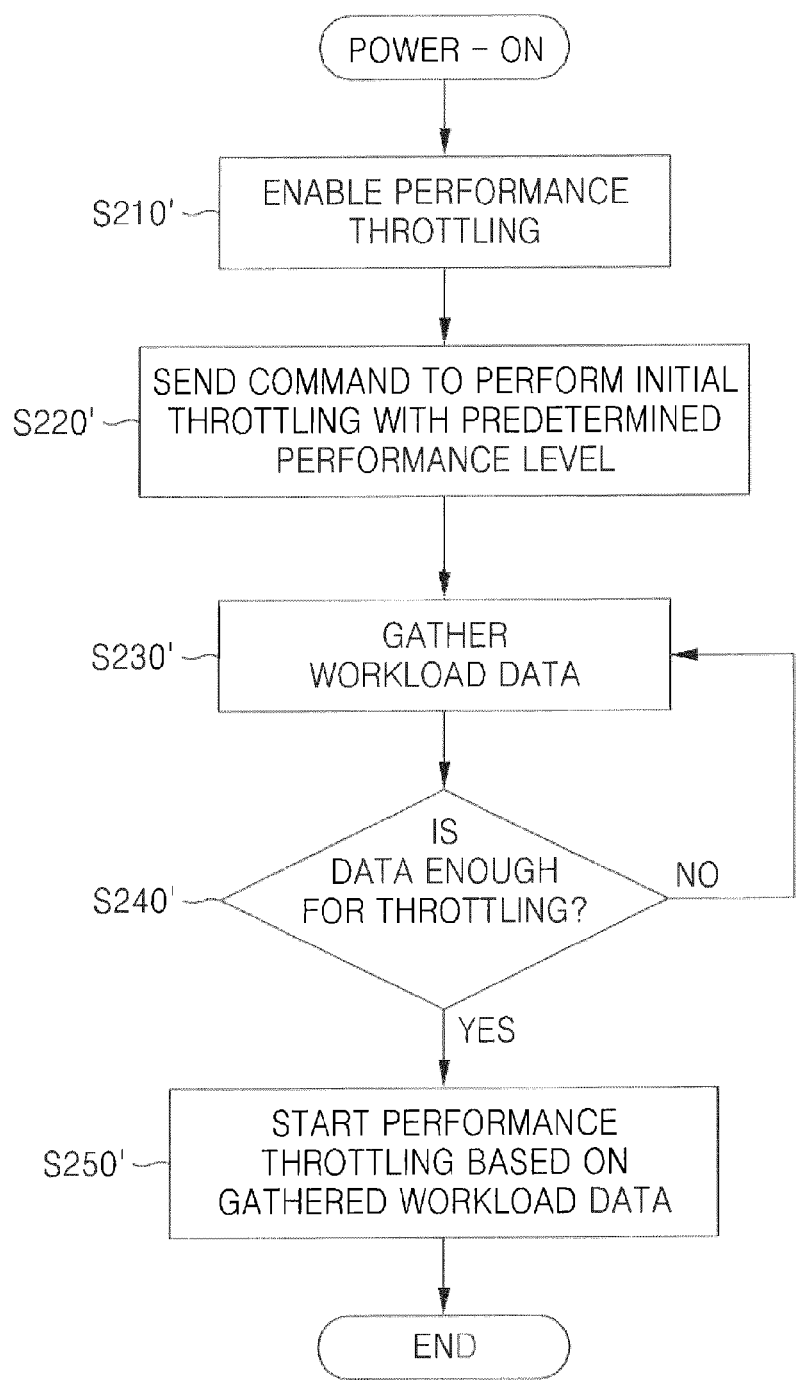
FIGS. 10A and 10B are flowcharts of methods of estimating the workload of a semiconductor storage device according to other embodiments of the present inventive concept.
Figure 10B:
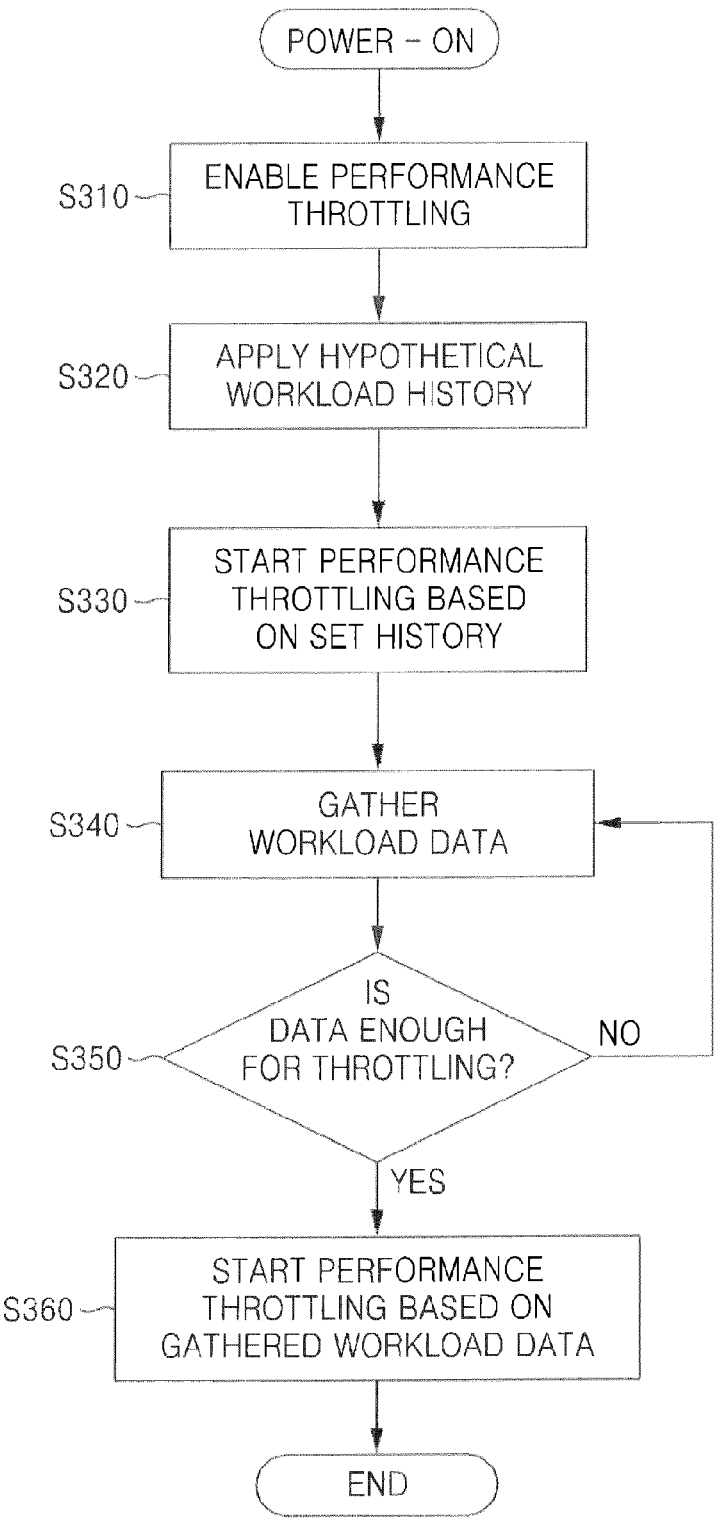

FIGS. 10A and 10B are flowcharts of methods of estimating the workload of the semiconductor storage device 10 according to other embodiments of the present inventive concept. The methods illustrated in FIGS. 10A and 10B may be performed by the host 20 illustrated in FIG. 4.

Referring FIGS. 4 and 10A, when the semiconductor storage device 10 is powered on, the host 20 may enable performance throttling of the semiconductor storage device 10 using a command in operation S210'. At this time, the host 20 may send a performance throttling enable command to the semiconductor storage device 10 to enable the performance throttling.

FIG. 11A is a table showing the format of the performance throttling enable command according to some embodiments of the present inventive concept. FIG. 11B is a table showing the format of a performance throttling information request command according to some embodiments of the present inventive concept.

Referring to FIGS. 11A and 11B, the host 20 sends to the semiconductor storage device 10 a command signal that includes a feature field, a count field, a logic block address (LBA) field, a device field, and a command field in relation to the performance throttling of the semiconductor storage device 10. Each field included in the command may be comprised of a predetermined number of bits. For instance, the command field, the device field, and the count field may be comprised of 8 bits.

In the performance throttling enable command illustrated in FIG. 11A, the command field is set to a predetermined value, e.g., FAh; the feature field is set to "1"; and the least significant bit (LSB) of the count field is set to "1" or "0". When the LSB of the count field is set to "1", a current command becomes a performance throttling enable command. When the LSB of the count field is set to "0", a current command becomes a performance throttling disable command. The semiconductor storage device 10 may set the throttling flag illustrated in FIG. 13 in response to the performance throttling enable command and may reset the throttling flag in response to the performance throttling disable command.

The host 20 may send to the semiconductor storage device 10 an initial performance setting command having a similar format to that illustrated in FIG. 11A or 11B in operation S220'. At this time, the controller 100 may store the initial performance level illustrated in FIG. 13 in a register or the memory 120 or 130 in response to the initial performance setting command.

Thereafter, workload data of the semiconductor storage device 10 is gathered in operation S230'. At this time, gathering of the workload data may be performed by the host 20 or by the semiconductor storage device 10.

To gather the workload data, the host 20 may send a period setting command to the semiconductor storage device 10 to set a parameter gathering period of the semiconductor storage device 10. The host 20 may also send a performance throttling reset command to the semiconductor storage device 10 in order to initialize all accumulated counts. The host 20 may send the performance throttling reset command before putting a workload having a different intensity and pattern on the semiconductor storage device 10.

Also, the host 20 may send to the semiconductor storage device 10 the performance throttling information request command illustrated in FIG. 11B that requests the gathered workload data. In response to the performance throttling information request command, the semiconductor storage device 10 may transmit the workload data to the host 20 using a performance throttling information response command having a format illustrated in FIG. 12.

When enough workload data for performance throttling is gathered in operation S240', the performance throttling based on gathered workload data can be started in operation S250'.

Referring to FIG. 10B, instead of setting the initial performance level, the host 20 may apply a hypothetical workload history in operation S320. Setting the hypothetical workload history refers to making an assumption that the semiconductor storage device 10 undergoes a hypothetical workload during a predetermined period before being powered on. To set the hypothetical workload history, the host 20 may provide hypothetical workload data in the semiconductor storage device 10. Once the hypothetical workload history is applied by the host 20, performance throttling can be performed based on the applied history at operation S330. Thereafter, workload data of the semiconductor storage device 10 is gathered in operation S340. At this time, gathering of the workload data may be performed by the host 20 or by the semiconductor storage device 10.

To gather the workload data, the host 20 may send a period setting command to the semiconductor storage device 10 to set a parameter gathering period of the semiconductor storage device 10. The host 20 may also send a performance throttling reset command to the semiconductor storage device 10 in order to initialize all accumulated counts. The host 20 may send the performance throttling reset command before putting a workload having a different intensity and pattern on the semiconductor storage device 10.

Also, the host 20 may send to the semiconductor storage device 10 the performance throttling information request command illustrated in FIG. 11B that requests the gathered workload data. In response to the performance throttling information request command, the semiconductor storage device 10 may transmit the workload data to the host 20 using a performance throttling information response command having a format illustrated in FIG. 12.

When it is determined in operation S350 that enough workload data for performance throttling based on gathered workload data is gathered in operation S340, the performance throttling based on gathered workload data can be started in operation S360.

The semiconductor storage device 10 according to an exemplary embodiment of the present inventive concept may be embedded in the electronic system such as mobile devices, laptop computers, or desktop computers. Some examples of the electronic system are illustrated in FIGS. 14 through 16.

Figure 14:
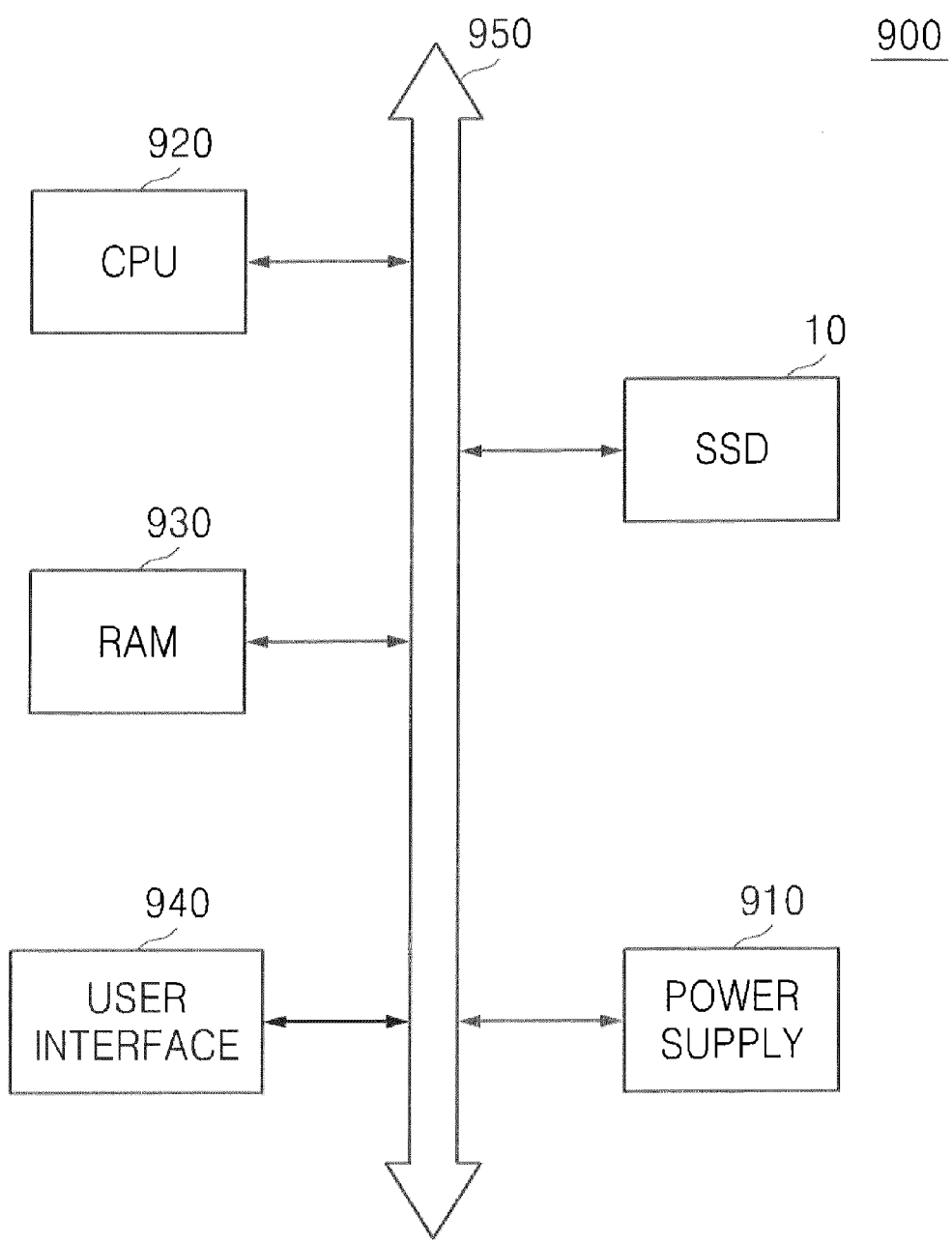
FIG. 14 is a block diagram of an electronic system according to some embodiments of the present inventive concept.

FIG. 14 is a block diagram of an electronic system according to some embodiments of the present inventive concept.

Referring to FIG. 14, the electronic system 900 according to the present exemplary embodiment may include a semiconductor storage device 10, a power supply 910, a central processing unit (CPU) 920, a RAM 930, a user interface 940, and a system bus 950 electrically connecting these elements.

The CPU 920 controls the overall operation of the electronic system 900. The RAM 930 stores information needed for the operation of the electronic system 900. The user interface 940 provides an interface between the electronic system 900 and a user. The power supply 910 supplies electric power to the internal constituent elements such as the CPU 920, the RAM 930, the user interface 940, and the semiconductor storage device 10.

The CPU 920 may correspond to the host, and the semiconductor storage device 10 may store or read data in response to a command from the host. The semiconductor storage device 10 according to an exemplary embodiment of the present inventive concept is as described above. A detailed description thereof will be thus omitted.

Figure 15A:
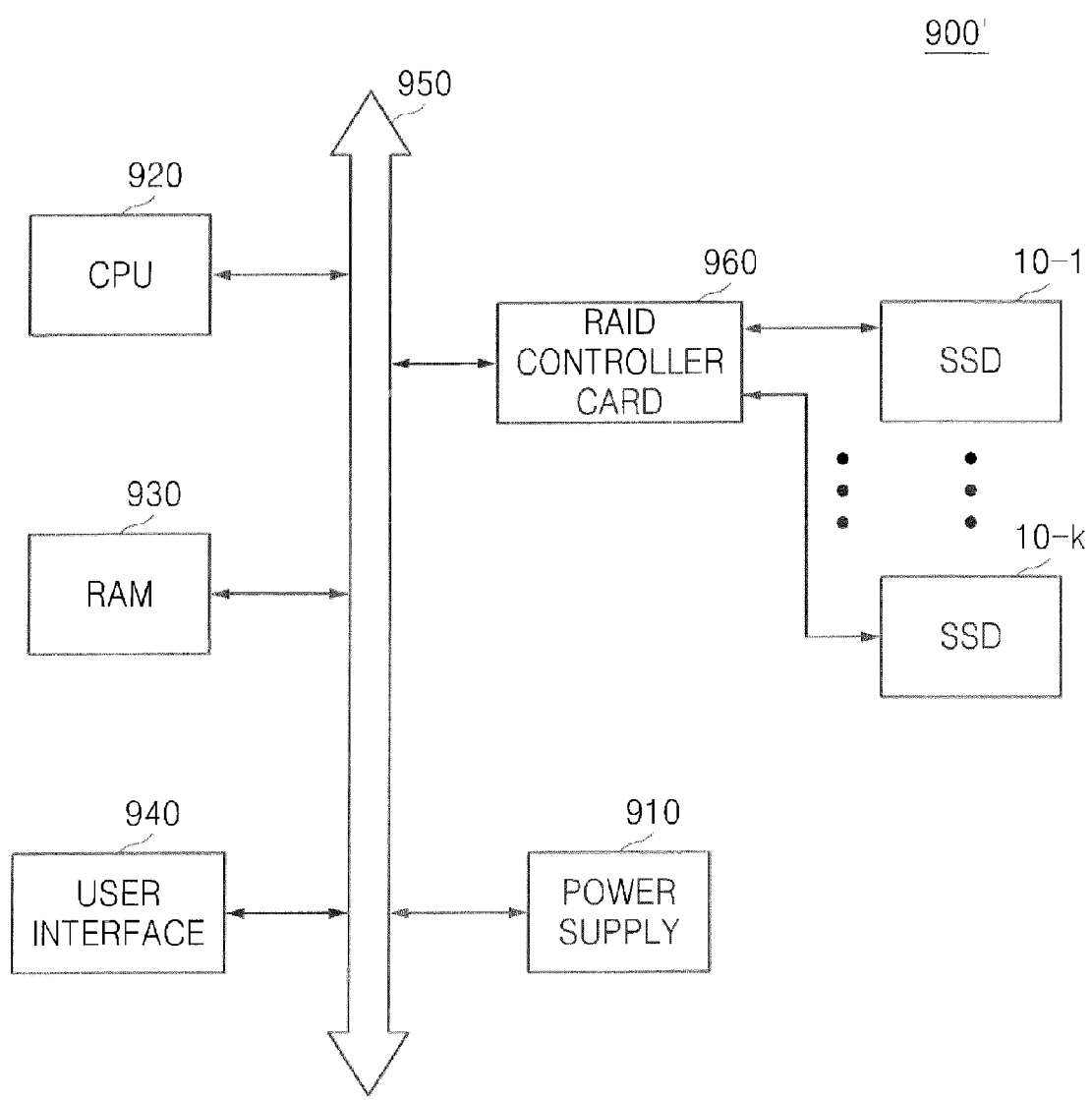
FIGS. 15A and 15B are block diagrams of electronic system systems according to some embodiments of the present inventive concept, respectively.
Figure 15B:
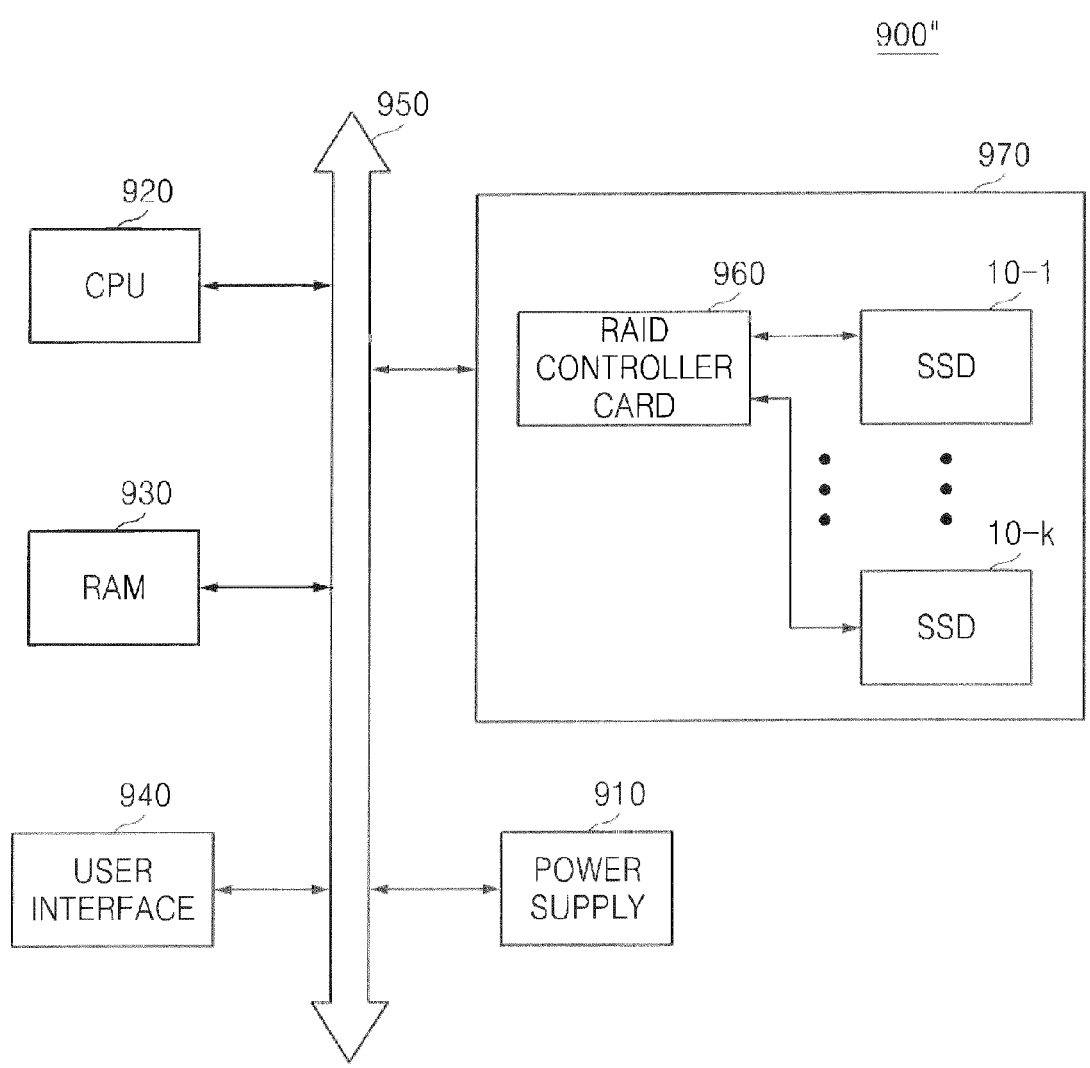
Figure 16:
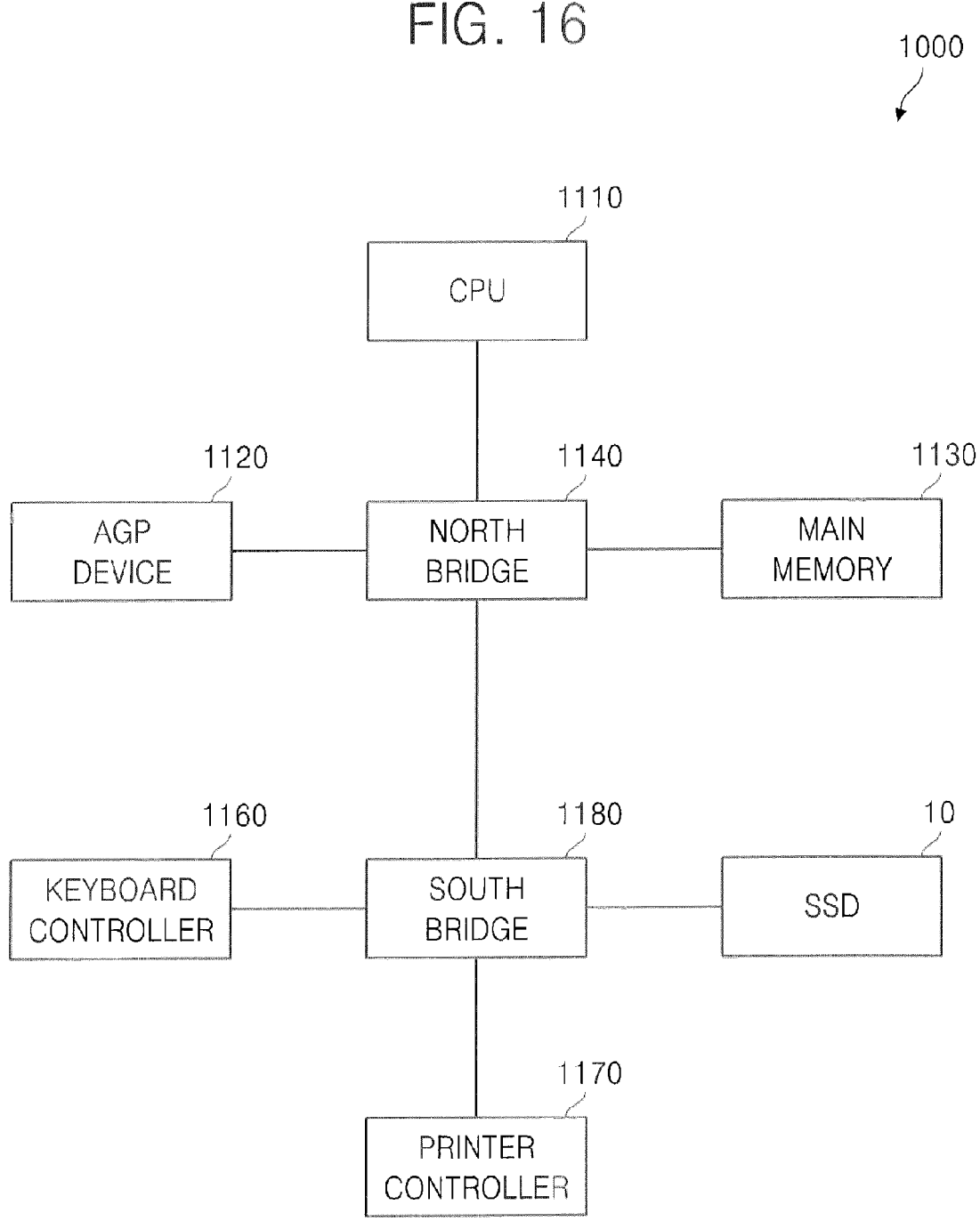
FIG. 16 shows a block diagram of a computer system having the semiconductor storage device of FIG. 1, according to an example embodiment of the present inventive concept.

FIGS. 15A and 15B are block diagrams of electronic systems according to other exemplary embodiments of the present inventive concept, respectively.

The electronic system as illustrated in FIG. 15A has a similar configuration to the electronic system as illustrated in FIG. 14, so only difference differences there-between will be described to avoid the repeated description.

The electronic system as illustrated in FIG. 15A further include includes a RAID controller card 960 as compared with the electronic system as illustrated in FIG. 14. The RAID controller card 960 is connected between the host 20 and the semiconductor storage device 10 to control the semiconductor storage device 10 in compliance with the host 20. That is, the semiconductor storage device 10 is installed into the RAID controller card 960 and communicates with the host 20 via the RAID controller card 960.

FIG. 16 shows a block diagram of a computer system 1000 having a solid state drive (SSD) implemented as the semiconductor storage device 10 of FIG. 1. The computer system 1000 includes a computer CPU (central processing unit) 1110, and includes an AGP (accelerated graphics port) device 1120 and a main memory 1130 coupled to the computer CPU 1110 via a north bridge 1140. The computer system 1000 further includes a keyboard controller 1160, a printer controller 1170, and the SSD 10 coupled to the computer CPU 1110 via a south bridge 1180 and the north bridge 1140. The components 1110, 1120, 1130, 1140, 1160, 1170, and 1180 of the computer system 1000 are generally and individually known to one of ordinary skill in the art. The computer system 1000 may be a PC (personal computer) system or a notebook computer in which the SSD 10 is used as a main storage device instead of a hard disk drive. However, the present inventive concept is not restricted thereto.

The present general inventive concept can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As described above, according to embodiments of the present inventive concept, a workload that a the semiconductor storage device 10 will undergo is estimated and the performance of the semiconductor storage device 10 is throttled using the estimated workload, thereby ensuring the life of the storage device 10.

While the present inventive concept has been particularly shown and described with reference to exemplary embodiments thereof, it will be understood by those of ordinary skill in the art that various changes in forms and details may be made therein without departing from the spirit and scope of the present inventive concept as defined by the following claims.

What is claimed is:

1. A method of maximizing the lifetime of a semiconductor storage device (SSD), the method comprising:
   collecting data corresponding to workload commands received by the SSD;
   operating the SSD according to respective ones of the workload commands received;
   estimating a workload of the SSD based on the collected data; and
   calculating a delay to be applied to next workload commands received by the SSD based on the estimated workload,
   wherein the estimating the workload is performed when a predetermined amount of data is collected and the delay is realized by at least one of controlling a speed of a clock signal applied to an element of the SSD and inserting an idle time between a first operation of the SSD and a second operation of the SSD, each of the first operation and the second operation including one of a read operation and a write operation.

2. The method of claim 1, wherein the predetermined amount of data is set by a manufacturer.

3. The method of claim 1, wherein the predetermined amount of data is data collected until a predetermined period lapses.

4. The method of claim 1, wherein the predetermined amount of data is data collected until a predetermined parameter value exceeds a predetermined reference value.

5. The method of claim 1, wherein when no previous data is collected from the workload commands, the estimating the workload is performed based on a predetermined workload level until the predetermined amount of data is collected.

6. The method of claim 1, wherein when no previous data is collected from the workload commands, the estimating the workload is performed based on a virtual history of a workload level until the predetermined amount of data is collected.

7. The method of claim 3, wherein the predetermined period is a period from start-up of the SSD to a current time.

8. The method of claim 3, wherein the predetermined period is one of a period of the previous day, a period of the previous week, and a period of the previous month.

9. A method of maximizing the lifetime of a semiconductor storage device (SSD), the method comprising:
   determining whether a performance throttling mode of the SSD is set upon powering on of the SSD;
   estimating a workload of the SSD from workload data gathered based on a command received from a host, when the performance throttling mode of the SSD is set; and
   starting a performance throttling of the SSD based on the estimated workload,
   wherein the workload data used to estimate the workload of the SSD is a value of a parameter counted during a predetermined period, and the performance throttling includes at least one of controlling a speed of a clock signal applied to an element of the SSD and inserting an idle time between a first operation of the SSD and a second operation of the SSD, each of the first operation and the second operation including one of a read operation and a write operation.

10. The method of claim 9, wherein the parameter counted is at least one among a number of commands that the host sends to the SSD.

11. The method of claim 9, wherein the parameter counted is one among a number of write commands that the host sends to the SSD, a number of read commands that the host sends to the SSD, an amount of data transferred to/from the host in response to the command, the amount of data received from the host in response to the write commands, the amount of data transferred to the host in response to the read commands, a number of program operations performed in the SSD, and a number of read operations performed in the SSD.

12. A method of throttling performance of a semiconductor storage device (SSD), the method comprising:
   enabling a throttling of the SSD;
   performing an initial throttling of the SSD with a predetermined performance level;
   gathering workload data based on commands received from a host; and
   starting a performance throttling of the SSD based on a predetermined amount of the gathered workload data, the performance throttling including at least one of controlling a speed of a clock signal applied to an element of the SSD and inserting an idle time between a first operation of the SSD and a second operation of the SSD, and of the first operation and the second operation including one of a read operation and a write operation.

13. The method of claim 12, wherein the initial throttling of the SSD is set based on a hypothetical workload history of the SSD.

14. The method of claim 12, wherein the predetermined amount of the gathered workload data is determined based on a value of a parameter counted during a predetermined period.

15. A semiconductor storage device (SSD), comprising:
   a non-volatile memory device; and
   a controller to control the non-volatile memory device to read and write data, to collect data corresponding to workload commands received by the SSD, to estimate a workload of the SSD based on the data corresponding to the workload commands, and to determine a new target performance level of the SSD based on the workload,
   wherein the controller comprises:
     a workload module to collect the data corresponding to the workload commands received by the SSD and to estimate the workload based on the data corresponding to the workload commands; and
     a throttle module control to determine the new target performance level of the SSD and to throttle a performance of the SSD based on the new target performance level by at least one of controlling a speed of a clock signal applied to an element of the SSD and inserting an idle time between a first operation of the SSD and a second operation of the SSD, each of the first operation and the second operation including one of a read operation and a write operation.

16. The SSD of claim 15, wherein the throttle module is configured to throttle the performance of the SSD by applying the new target performance level to a clock generator of the SSD.

17. A method of controlling performance of a semiconductor storage device (SSD), the method comprising:
   operating the SSD according to a preset performance level;
   when a command is received to enable a performance throttling of the SSD, gathering workload data to estimate a workload on the SSD; and
   applying the performance throttling on the SSD when a predetermined amount of the workload data has been gathered, the performance throttling including at least one of controlling a speed of a clock signal applied to an element of the SSD and inserting an idle time between a first operation of the SSD and a second operation of the SSD, each of the first operation and the second operation including one of a read operation and a write operation.

18. The method of claim 17, wherein the preset performance level is set during manufacture.

19. The method of claim 17, wherein the preset performance level is set as a hypothetical workload history of the SSD.

20. The method of claim 17, wherein the workload data is a value of a parameter counted during a predetermined period.

21. The method of claim 20, wherein the parameter includes at least one among a number of commands that a host applies to the SSD, a number of write commands that the host applies to the SSD, a number of read commands that the host applies to the SSD, an amount of data transferred to/from the host in response to a command, an amount of data received from the host in response to the write commands, an amount of data received from the host in response to the read commands, a number of program operations performed in the SSD, and a number of read operations performed in the SSD.

* * * * *

UNITED STATES PATENT AND TRADEMARK OFFICE
CERTIFICATE OF CORRECTION

| | | |
|---|---|---|
| PATENT NO. | : 8,862,807 B2 | Page 1 of 1 |
| APPLICATION NO. | : 13/166257 | |
| DATED | : October 14, 2014 | |
| INVENTOR(S) | : Han Bin Yoon et al. | |

It is certified that error appears in the above-identified patent and that said Letters Patent is hereby corrected as shown below:

Title page, item (75) Inventors should read as follows: Han Bin Yoon, Hwaseong-si, (KR); Yeong-Jae Woo, Guri-si (KR); Dong Gi Lee, Yongin-si (KR); Seong sik HWANG, Seoul (KR); Hyuck-Sun Kwon, Seoul (KR)

Signed and Sealed this
Twenty-fourth Day of March, 2015

Michelle K. Lee
*Director of the United States Patent and Trademark Office*